United States Patent
Ifrah et al.

(10) Patent No.: US 8,524,183 B2
(45) Date of Patent: Sep. 3, 2013

(54) COMPOSITION CONTAINING OXIDES OF ZIRCONIUM, CERIUM AND ANOTHER RARE EARTH HAVING REDUCED MAXIMUM REDUCIBILITY TEMPERATURE, A PROCESS FOR PREPARATION AND USE THEREOF IN THE FIELD OF CATALYSIS

(75) Inventors: Simon Ifrah, Lagord (FR); Emmanuel Rohart, Sainte Soulle (FR); Julien Hernandez, Antony (FR); Stéphane Denaire, Jouy le Moutier (FR)

(73) Assignee: Rhodia Operations, Aubervilliers (FR)

( * ) Notice: Subject to any disclaimer, the term of this patent is extended or adjusted under 35 U.S.C. 154(b) by 0 days.

(21) Appl. No.: 13/521,673

(22) PCT Filed: Jan. 10, 2011

(86) PCT No.: PCT/EP2011/050206
§ 371 (c)(1),
(2), (4) Date: Jul. 11, 2012

(87) PCT Pub. No.: WO2011/083157
PCT Pub. Date: Jul. 14, 2011

(65) Prior Publication Data
US 2013/0052108 A1 Feb. 28, 2013

(30) Foreign Application Priority Data

Jan. 11, 2010 (FR) .................................. 10 00087

(51) Int. Cl.
*B01D 53/94* (2006.01)
*B01J 21/06* (2006.01)
*B01J 23/10* (2006.01)
*B01J 37/00* (2006.01)
*B01J 37/08* (2006.01)

(52) U.S. Cl.
USPC ........ 423/213.2; 502/302; 502/303; 502/304; 502/349; 60/299

(58) Field of Classification Search
USPC .............. 423/213.2; 502/302, 303, 304, 349; 60/299
See application file for complete search history.

(56) References Cited

U.S. PATENT DOCUMENTS 5,762,894 A * 6/1998 Takatori et al. ............... 423/263
6,214,306 B1   4/2001 Aubert et al.
(Continued)

FOREIGN PATENT DOCUMENTS
EP  1870378 A1  12/2007
FR  2736343 A1  1/1997
(Continued)

OTHER PUBLICATIONS

Search Report issued on Mar. 2, 2011 by the European Patent Office as the International Search Authority in International Patent Application No. PCT/EP2011/050206, and an English language translation of the Search Report.

*Primary Examiner* — Timothy Vanoy
(74) *Attorney, Agent, or Firm* — Dentons US LLP

(57) ABSTRACT

A composition is described that includes oxides of zirconium, cerium and another rare earth different from cerium, having a cerium oxide content not exceeding 50 wt % and, after calcination at 1000° C. for 6 hours, a maximal reducibility temperature not exceeding 500° C. and a specific surface of at least 45 m²/g. The composition can be prepared according to a method that includes continuously reacting a mixture that includes compounds of zirconium, cerium and another rare earth having a basic compound for a residence time not exceeding 100 milliseconds, wherein the precipitate is heated and contacted with a surfactant before calcination.

20 Claims, 2 Drawing Sheets

(56) References Cited

U.S. PATENT DOCUMENTS

| | | | |
|---|---|---|---|
| 6,464,946 B1 * | 10/2002 | Yamada et al. | 422/177 |
| 8,158,552 B2 * | 4/2012 | Hori et al. | 502/304 |
| 2006/0178261 A1 | 8/2006 | Larcher et al. | |
| 2006/0210462 A1 * | 9/2006 | Larcher et al. | 423/213.2 |
| 2007/0264486 A1 * | 11/2007 | Verdier | 428/315.5 |
| 2011/0097252 A1 * | 4/2011 | Larcher et al. | 423/213.2 |
| 2011/0206583 A1 * | 8/2011 | Larcher et al. | 423/213.2 |

FOREIGN PATENT DOCUMENTS

| | | |
|---|---|---|
| FR | 2852591 A1 | 9/2004 |
| WO | 03/020643 A1 | 3/2003 |
| WO | 2009/103202 A1 | 8/2009 |

* cited by examiner

COMPOSITION CONTAINING OXIDES OF ZIRCONIUM, CERIUM AND ANOTHER RARE EARTH HAVING REDUCED MAXIMUM REDUCIBILITY TEMPERATURE, A PROCESS FOR PREPARATION AND USE THEREOF IN THE FIELD OF CATALYSIS

CROSS-REFERENCE TO PRIOR APPLICATIONS

This application is a National Stage of PCT/EP2011/050206, filed Jan. 10, 2011, designating the United States (published in French on Jul. 14, 2011, as WO 2011/083157 A1; the title and abstract were published in English), which claims priority of FR 1000087, filed Jan. 11, 2010, each hereby expressly incorporated by reference in its entirety and each assigned to the assignee hereof.

The present invention relates to a composition containing oxides of zirconium, cerium and at least one rare earth other than cerium, with a high maximum reducibility temperature, a process for preparation thereof and use thereof in the field of catalysis.

Currently catalysts called multifunctional catalysts are used to treat exhaust gases for internal combustion engines (automotive postcombustion catalysis). Multifunctional is understood to mean catalysts capable of not only oxidizing carbon monoxide and hydrocarbons, in particular, present in exhaust gases but also reducing nitrogen oxides, in particular, also present in these gases ("three-way" catalysts). Products containing zirconium oxide, cerium oxide and one or more oxides of other rare earths appear today to be particularly important and beneficial constituents that enter into the composition of this type of catalyst. For efficiency, these constituents must have a high specific surface area even after having being subject to high temperatures, for example of at least 900° C.

Another quality required for these constituents of catalysts is reducibility. Reducibility is understood here and for the remainder of the description to be the capacity of the catalyst to reduce itself in a reducing atmosphere and to oxidize itself again in an oxidizing atmosphere. This reducibility and, consequently, catalyst efficacy, are highest at a temperature that is currently quite high for catalysts containing the previously cited products. Thus, this temperature is generally of the order of 550° C. As it happens, there is a need for catalysts in which this temperature is reduced and therefore catalysts that perform well enough in lower temperature ranges.

From the current state of the art, it appears that these two characteristics are often difficult to reconcile, i.e. high reducibility at lower temperature has the counterpart of rather low specific surface area.

The object of the invention is to provide a composition of this type that has the combination of a high specific surface area and maximum reducibility at lower temperature.

With this aim, the composition of the invention contains oxides of zirconium, cerium and at least one rare earth other than cerium, having a cerium oxide content of at most 50% by mass, and is characterized in that after calcination at 1000° C. for 6 hours, it has a maximum reducibility temperature of at most 500° C. and a specific surface area of at least 45 m²/g.

Other characteristics, details and advantages of the invention will appear more completely upon reading the description that follows, given with reference to the appended drawings in which.

Figure 1:
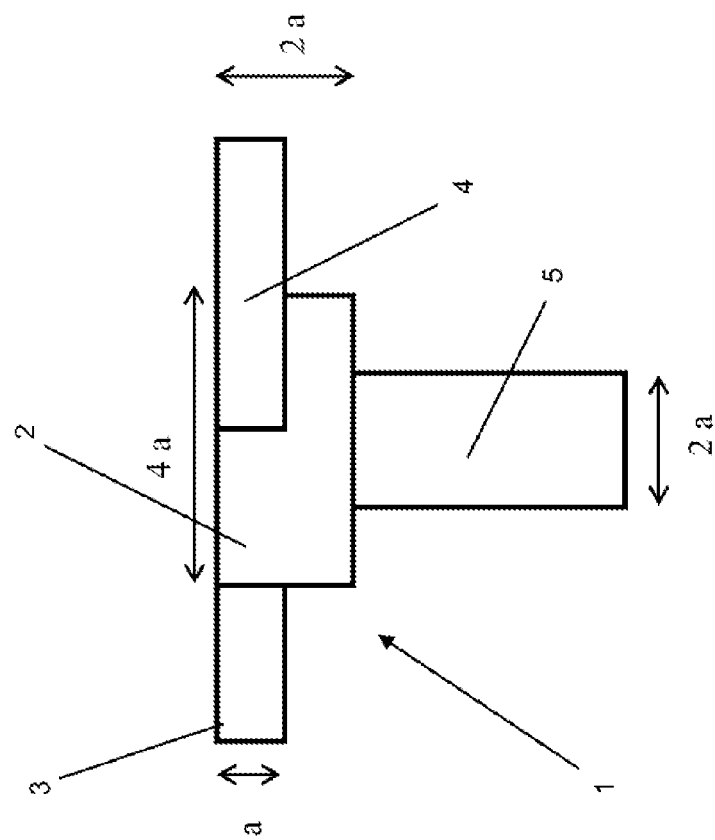
FIG. 1 is a diagram of a reactor used to implement the process for preparing the composition of the invention.

For the remainder of the description, specific surface area is understood to mean the specific B.E.T. surface area determined by nitrogen adsorption in accordance with ASTM standard D 3663-78 established from the BRUNAUER-EMMETT-TELLER method described in "The Journal of the American Chemical Society, 60, 309 (1938)".

For the present description, rare earth is understood to mean the elements of the group constituted by yttrium and elements of the periodic table having an atomic number of between 57 and 71 inclusive.

Additionally, calcinations for a given temperature and duration correspond, unless otherwise indicated, to calcinations in air at a temperature plateau over the period indicated.

The contents are given in mass of oxide unless otherwise indicated. Cerium oxide is in the form of ceric oxide; the oxides of the other rare earths are in the form of $Ln_2O_3$, Ln designating the rare earth, with the exception of praseodymium expressed in the form $Pr_6O_{11}$.

In the remainder of the description, unless otherwise indicated, the limit values of the ranges given are included in the ranges.

The compositions as claimed in the invention are first characterized by the nature of their constituent parts.

The compositions of the invention are of the mixed oxide type, containing zirconium oxide and further comprising cerium oxide and an oxide of at least one rare earth other than cerium. For the remainder of the description it should be understood that, if, in order to simplify, only one rare earth is mentioned, it is clearly understood that the invention applies to the case where the compositions comprise several rare earths, in particular two rare earths.

The rare earth other than cerium may be more particularly selected from among yttrium, lanthanum, neodymium, praseodymium or gadolinium. More particularly, compositions containing zirconium, cerium, praseodymium and lanthanum oxides, those containing zirconium, cerium, neodymium and lanthanum oxides, those containing zirconium, cerium, lanthanum and gadolinium oxides and those containing zirconium, cerium, lanthanum and yttrium oxides can be cited.

The cerium oxide content is at most 50%, more particularly at most 40%. It is preferably at least 10%, more particularly at least 15% and most particularly at least 20%. It can accordingly be between 10% and 50% and in particular between 10% and 40%.

The oxide content of the other rare earth, or all the other rare earths, is generally at most 30%, more particularly at most 20% and at least 2%, preferably at least 5% and in particular at least 10%. It may in particular be between 5% and 20%.

The invention also relates to the compositions constituted essentially of oxides of zirconium, cerium and at least one rare earth other than cerium. From this it is understood that said compositions may include other elements as traces or impurities, such as hafnium in particular, but that they do not include other elements that can in particular influence their specific surface area and/or their reducibility properties.

The compositions of the invention have as essential characteristic the fact of having a maximum reducibility temperature of at most 500° C. This maximum reducibility temperature may be more particularly at most 480° C. and most particularly at most 450° C. This temperature is generally at least 430° C. and may accordingly be between 430° C. and 500° C. and in particular between 450° C. and 480° C.

The reducibility of the compositions is determined by measuring their capacity to capture hydrogen as a function of temperature. From this measurement a maximum reducibility temperature is determined that corresponds to the temperature at which the hydrogen capture is highest and where, in other words, the reduction of cerium IV into cerium III is also highest. The values given hereinabove are measured, unless otherwise indicated, on compositions having undergone calcination at 1000° C. for 6 hours.

The compositions of the invention as described hereinabove also have a maximum reducibility temperature that is at most 500° C. after calcination at 1100° C. for 4 hours.

The compositions of the invention also have particular specific surface area characteristics. Indeed, although they have reduced maximum reducibility temperature, they further offer high specific surface areas even at high temperatures.

Accordingly, after calcination at 900° C. for 6 hours they may have a specific surface area of at least 60 m$^2$/g, more particularly of at least 70 m$^2$/g. Under these same calcination conditions, specific surface areas up to a value of about 90 m$^2$/g may be obtained.

Moreover, after calcination at 1000° C. for 6 hours they have a specific surface area of at least 45 m$^2$/g, more particularly of at least 50 m$^2$/g and most particularly of at least 55 m$^2$/g. Under these same calcination conditions specific surface areas up to a value of about 65 m$^2$/g may be obtained.

A further beneficial characteristic of the compositions of the invention is that they may be in the form of particles that can be deagglomerated. Accordingly, from a simple sonication treatment, these particles may vary in median diameter ($d_{50}$) after this treatment by at least 30% and more particularly by at least 50%, this variation being expressed by the ratio $100(d_{50}-d'_{50})/d_{50}$, with $d_{50}$ and $d'_{50}$ designating respectively the diameters before and after treatment. Only as an example, the compositions of the invention may be in particle form where the median diameter ($d'_{50}$) after such a treatment is at most 10 μm, more particularly at most 8 μm and most particularly at most 6 μm.

The particle size values given here and for the remainder of the description are measured using a Coulter laser particle size analyzer on a sample of particles dispersed in water and subjected to sonication (120 W) for 5 minutes. More precise measurement conditions are given in the examples at the end of the description.

The compositions of the invention are generally in the form of a pure solid solution of cerium oxide and the other rare earth. It is understood that the cerium and the other rare earth are totally present in solid solution in the zirconium oxide. The X-Ray diffraction patterns for these compositions show in particular, within these compositions, the existence of a clearly identifiable single phase corresponding to that of a crystallized zirconium oxide in the tetragonal system, meaning therefore that cerium and the other rare earth have been incorporated in the crystalline network of the zirconium oxide, and therefore that a true solid solution has been obtained. It should be noted that the compositions of the invention have this characteristic of solid solution even after calcination at high temperature, for example at least 1000° C. for 6 hours.

The process for preparing the compositions of the invention will now be described.

This process is characterized in that it comprises the following steps:
  (a) a liquid mixture comprising compounds of zirconium, cerium and the other rare earth is formed;
  (b) said mixture is reacted in a continuous process in a reactor with a basic compound, the residence time in the reactor being at most 100 milliseconds, and from which a precipitate is obtained when it leaves the reactor;
  (c) said precipitate is heated in an aqueous medium, the medium being held at a pH of at least 5;
  (d) an additive is added to the precipitate obtained in the previous step, selected from among anionic surfactants, nonionic surfactants, polyethylene glycols, carboxylic acids and salts thereof and surfactants of the carboxymethyl fatty acid ethoxylate type;
  (e) the resulting precipitate is calcinated.

The first step (a) of the process consists therefore in preparing a mixture in a liquid medium of compounds of the elements that constitute the composition, i.e. zirconium, cerium and the extra rare earth.

The mixture is generally made in a liquid medium, preferably water.

The compounds are preferably soluble compounds. This can in particular be zirconium salts, cerium salts and rare earth salts. These compounds may be selected from among nitrates, sulfates, acetates, chlorides, ceric ammonium nitrate.

As examples, zirconium sulfate, zirconyl nitrate and zirconyl chloride can be cited. Zirconyl nitrate is most generally used. Cerium IV salts can also in particular be cited, such as nitrates or ceric ammonium nitrate for example, which are particularly suitable here. Preferably, ceric nitrate is used. It is advantageous to use salts with purity of at least 99.5%, and more particularly at least 99.9%. An aqueous solution of ceric nitrate can for example be obtained by reacting nitric acid on a cerium oxide hydrate prepared conventionally by reacting a solution of a cerous salt, for example cerous nitrate, and a solution of ammonia in the presence of hydrogen peroxide. Further, preferably, a ceric nitrate solution obtained by electrolytic oxidation of a cerous nitrate solution as described in document FR-A-2 570 087 can be used; here this constitutes a beneficial raw material.

It should be noted here that aqueous solutions of cerium salts and zirconyl salts may have a certain initial free acidity that can be adjusted by adding a base or an acid. It is however possible both to use an initial solution of cerium salts and zirconium salts that do have a certain free acidity as stated hereinabove, or to use solutions that will have been previously neutralized to varying degrees. A basic compound may be added to the previously cited mixture to neutralize and limit this acidity. This basic compound may be for example a solution of ammonia or even alkaline hydroxides (sodium, potassium, etc.), but preferably an ammonia solution.

Finally it should be noted that when the starting mixture contains cerium III, it is preferable to use an oxidizing agent during the process, for example hydrogen peroxide. This oxidizing agent may be used by being added to the reaction medium during step (a), during step (b) or at the start of step (c).

The mixture may be obtained without preference from initially solid compounds that are added to a water base in a tank, for example, or directly from solutions of these compounds then said solutions mixed in any order.

In the second step (b) of the process, a basic compound is added to said mixture to make them react. Hydroxide compounds can be used as base or basic compound. Alkaline or alkaline earth hydroxides can be cited. Secondary, tertiary or quaternary amines can also be used. However, amines and ammonia may be preferred insofar as they reduce the risks of pollution by the alkalin metal cations or alkaline-earth metal cations. Urea can also be mentioned. The basic compound can more particularly be used in solution form.

The reaction between the starting mixture and the basic compound is continuous in a reactor. Thus, this reaction occurs by adding the reagents continuously and also removing the reaction product continuously.

The reaction must occur under conditions such that the reaction medium's residence time in the reactor is at most 100 milliseconds, more particularly at most 50 milliseconds, preferably at most 20 milliseconds. This residence time may be at least 5 milliseconds and can for example be between 10 and 20 milliseconds.

It may be preferable to perform step (b) by using a stoichiometric excess of basic compound to ensure a maximum precipitation yield.

The reaction is preferably performed with vigorous stirring, for example under conditions where the reaction medium is turbulent.

The reaction is generally performed at room temperature.

A rapid mixer can be used as reactor.

The rapid mixer may be in particular selected from among symmetrical T- or Y-shaped mixers (or tubes), asymmetrical T- or Y-shaped mixers (or tubes), tangential-jet mixers, Hartridge-Roughton mixers, vortex mixers, rotor-stator mixers.

Symmetrical T- or Y-shaped mixers (or tubes) are generally constituted of two opposed (T-shaped) tubes or two tubes forming an angle less than 180° (Y-shaped), with the same diameter, discharging in a central tube whose diameter is the same or greater than that of the previous two tubes. They are called "symmetrical" because the two injection tubes for the reagents have the same diameter and the same angle relative to the central tube, the device being characterized by an axis of symmetry. Preferably, the central tube has a diameter about twice as high as the diameter of the opposed tubes; similarly the fluid rate in the central tube is preferably half that of the opposed tubes.

However, in particular when both fluids to be added do not have the same flow rate, an asymmetrical T- or Y-shaped mixer (or tube) is preferred rather than a symmetrical T- or Y-shaped mixer (or tube). In the asymmetrical devices, one of the fluids (generally the one with the lower flow rate) is injected into the central tube using a side tube with smaller diameter. The latter generally forms a 90° angle with the central tube (T-shaped tube); this angle may be other than 90° (Y-shaped tube), giving co-current systems (for example a 45° angle) or counter-current systems (for example a 135° angle) compared to the other current.

Advantageously, in the process as claimed in the present invention, a tangential-jet mixer is used, for example a Hartridge-Roughton mixer.

FIG. 1 is a diagram which shows a mixer of this type. This mixer 1 comprises a chamber 2 having at least two tangential admissions 3 and 4 through which the reagents enter separately (but at the same time), i.e. here the mixture formed in step (a) and the basic compound, and an axial outlet 5 through which the reaction medium exits, preferably towards a reactor (tank) arranged in series after said mixer. The two tangential admissions are preferably located symmetrically and opposed relative to the central axis of the chamber 2.

The chamber 2 of the Hartridge-Roughton tangential-jet mixer used generally has a circular cross-section and is preferably cylindrical.

Each tangential admission tube may have an inner height (a) having a cross section from 0.5 to 80 mm.

This inner height (a) may be between 0.5 and 10 mm, in particular between 1 and 9 mm, for example between 2 and 7 mm. However, in particular on the industrial scale, it is preferably between 10 and 80 mm, in particular between 20 and 60 mm, for example between 30 and 50 mm.

The inner diameter of the chamber 2 of the Hartridge-Roughton tangential-jet mixer used may be comprised between 3a and 6a, in particular between 3a and 5a, for example equal to 4a; the inner diameter of the axial exit tube 5 may be comprised between 1a and 3a, in particular between 1.5a and 2.5a, for example equal to 2a.

The height of the chamber 2 of the mixer may be comprised between 1a and 3a in particular between 1.5 and 2.5a, for example equal to 2a.

The reaction performed at step (b) of the process leads to the formation of a precipitate that is removed from the reactor and recovered for use in step (c).

This step (c) is a step of heating the precipitate in an aqueous medium.

This heating can be carried out directly on the reaction medium obtained after reaction with the basic compound or on a suspension obtained after separating the precipitate from the reaction medium, optional washing and putting the precipitate back into water. The temperature at which the medium is heated is at least 100° C. and more particularly at least 130° C. It may be between 100° C. and 200° C. The heating operation may be performed by adding the liquid medium to a closed chamber (a closed reactor of the autoclave type). Under the temperature conditions given hereinabove, and in an aqueous medium, it can be specified, as an illustration, that the pressure in the closed reactor may vary between an upper value of 1 bar ($10^5$ Pa) and 165 bar ($1.65 \times 10^7$ Pa), preferably between 5 bar ($5 \times 10^5$ Pa) and 165 bar ($1.65 \times 10^7$ Pa). Heating can also be performed in an open reactor at temperatures around 100° C.

Heating may be performed in air, or in an inert gaseous atmosphere, preferably a nitrogen atmosphere.

Heating duration may vary within broad limits, for example between 1 minute and 2 hours, these values being given just for indication.

The medium subject to heating has a pH of at least 5.

Preferably, this pH is basic, i.e. it is above 7 and, more particularly, at least 8.

It is possible to heat several times. Accordingly, the precipitate obtained after the heating step and optionally washed can be suspended in water again then the resulting medium heated again. This other heating is performed under the same conditions as those described for the first heating.

The following step of the process may be performed according to two variants.

According to a first variant, to the reaction medium from the previous step an additive that is selected from among anionic surfactants, nonionic surfactants, polyethylene glycols, carboxylic acids and salts thereof, and surfactants of the carboxymethyl fatty alcohol ethoxylate type is added. Regarding this additive, reference may be made to the teaching of application WO-98/45212 and use may be made of the surfactants described in this document.

As anionic surfactants the following can be mentioned: ethoxycarboxylates, ethoxylated or propoxylated fatty acids, in particular those of the ALKAMULS® brand, sarcosinates having the formula R—C(O)N(CH$_3$)CH$_2$COO$^-$, betaines having the formula RR'NH—CH$_3$—COO$^-$, with R and R' being alkyl or alkylaryl groups, phosphate esters, in particular those of the RHODAFAC® brand, sulfates such as alcohol sulfates, ether alcohol sulfates and alkanolamide ethoxylate sulfates, sulfonates such as sulfosuccinates, alkyl benzenes and alkyl naphthalene sulfonates.

As nonionic surfactant, the following can be mentioned: acetylene surfactants, ethoxylated or propoxylated fatty alcohols, for example those of the RHODASURF® or ANTAROX® brands, alkanolamides, amine oxides, ethoxylated alkanolamides, long-chain ethoxylated or propoxylated amines, for example those of the RHODAMEEN® brand, ethylene oxide/propylene oxide copolymers, sorbitan derivatives, ethylene glycol, propylene glycol, glycerol, polyglyceryl esters and ethoxylated derivatives thereof, alkylamines, alkylimidazolines, ethoxylated oils and ethoxylated or propoxylated alkylphenols, in particular those of the IGEPAL® brand. The products cited in WO-98/45212 under the brand names IGEPAL®, DOWANOL®, RHODAMOX® and ALKAMIDE® may also in particular be cited.

Regarding the carboxylic acids, in particular aliphatic mono- or dicarboxylic acids can be used, and more particularly the saturated acids from this group. Fatty acids and more particularly saturated fatty acids can also be used. In particular formic, acetic, propionic, butyric, isobutyric, valeric, caproic, caprylic, capric, lauric, myristic, palmitic, stearic, hydroxystearic, ethyl-2-hexanoic and behenic acids can be cited. As dicarboxylic acids, oxalic, malonic, succinic, glutaric, adipic, pimelic, suberic, azelaic and sebacic acids can be mentioned.

The salts of carboxylic acids may also be used, in particular ammonium salts thereof.

As an example, more particularly lauric acid and ammonium laurate can be cited.

Finally, a surfactant selected from among carboxymethyl fatty alcohol ethoxylates can be used.

Products of the carboxymethyl fatty alcohol ethoxylate type are understood to be products constituted of ethoxylated or propoxylated fatty alcohols including a CH$_2$—COOH group at the end of the chain.

These products may have the formula:

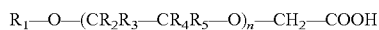
R$_1$—O—(CR$_2$R$_3$—CR$_4$R$_5$—O)$_n$—CH$_2$—COOH wherein R$_1$ designates a saturated or unsaturated carbon chain generally at most 22 carbon atoms long, preferably at least 12 carbon atoms long; R$_2$, R$_3$, R$_4$ and R$_5$ may be the same and represent hydrogen or R$_2$ may also represent a CH$_3$ group and R$_3$, R$_4$ and R$_5$ represent hydrogen; n is a whole number other than zero that may be up to 50 and more particularly between 5 and 15, these values being included. It should be noted that a surfactant may be constituted of a mixture of products having the above formula for which R$_1$ may be saturated and unsaturated respectively or products including both —CH$_2$—CH$_2$—O— and —C(CH$_3$)—CH$_2$—O— groups.

Another variant consists in first separating the precipitate from step (c) then adding the surfactant additive to this precipitate.

The quantity of surfactant used, expressed as a percentage by weight of additive with respect to the weight of the composition calculated in oxide, is generally between 5% and 100%, more particularly between 15% and 60%.

After adding the surfactant, the resulting mixture is held preferably with stirring for a period that may be about one hour. Then optionally the precipitate is separated from the liquid medium by any known means.

The separated precipitate may optionally be washed, in particular by aqueous ammonia.

In a final step of the process as claimed in the invention, the precipitate recovered is then calcinated. This calcination develops the crystallinity of the product formed and may also be adjusted and/or selected as a function of the temperature for subsequent planned use of the composition as claimed in the invention, taking into account the fact that the specific surface area of the product decreases as the temperature used for calcination increases. Such a calcination is generally performed in air, but a calcination performed for example under an inert gas or a controlled atmosphere (oxidizing or reducing) is obviously not excluded.

In practice, the calcination temperature is generally limited to a range of values of between 300 and 900° C.

The product resulting from the calcination is in the form of a powder and, if necessary, it may be deagglomerated or milled depending on the desired size for the particles constituting this powder.

The compositions of the invention may also optionally be shaped as granules, beads, cylinders or honeycombs of various sizes.

These compositions of the invention may be used as catalysts or supports for catalysts. Accordingly, the also relates to catalytic systems comprising the compositions of the invention. For such systems, these compositions may be applied to any support usually used in the field of catalysis, i.e. in particular thermally inert supports. This support may be selected from among alumina, titanium oxide, cerium oxide, zirconium oxide, silica, spinels, zeolites, silicates, crystalline silicoaluminum phosphates, crystalline aluminum phosphates.

The compositions may also be used in catalytic systems comprising a coating (wash coat) with catalytic properties and based on these compositions, on a substrate of the metallic monolith or ceramic type, for example. The coating may also comprise a support of the type such as those mentioned hereinabove. This coating is obtained by mixing the composition with the support so as to form a suspension that may then be deposited on the substrate.

These catalytic systems and more particularly the compositions of the invention may find numerous applications. They are thus particularly suitable for, and thus usable in, the catalysis of various reactions, for instance dehydration, hydrosulfuration, hydro-denitrification, desulfuration, hydrodesulfuration, dehydrohalogenation, reforming, vapor reforming, cracking, hydrocracking, hydrogenation, dehydrogenation, isomerization, dismutation, oxychlorination, dehydrocyclization of hydrocarbons or other organic compounds, reduction and/or oxidation reactions, the Claus reaction, the treatment of the exhaust gases of internal combustion engines, demetallation, methanation, shift conversion, catalytic oxidation of the soots emitted by internal combustion engines such as diesel or petrol engines running at low capacity. The catalytic systems and the compositions of the invention may finally be used as NOx scavengers.

In the case of these uses in catalysis, the compositions of the invention are generally used in combination with precious metals, where they therefore serve as support for these metals. The nature of these metals and the techniques for incorporating them into the support compositions are well known to those skilled in the art. For example, the metals may be platinum, rhodium, palladium or iridium, and may in particular be incorporated into the compositions by impregnation.

Among the used cited, the treatment of exhaust gases for internal combustion engines (automotive postcombustion catalysis) constitutes a particularly beneficial application. The invention accordingly also relates to a process for treating exhaust gases for internal combustion engines that is characterized in that the catalyst used is a catalytic system as described hereinabove or a composition as claimed in the invention and as described previously.

Examples will now be given.

In these examples, reducibility is measured by performing reduction at a programmed temperature in the following manner. An MI-100 Altamira is used with a silica reactor and a 200 mg sample that has been calcinated previously for either 6 hours at 1000° C. in air or 4 hours at 1100° C. in air. The gas is 10% hydrogen by volume in argon with a flow rate of 30 ml/min. The temperature rise is from room temperature to 900° C. at a rate of 10° C./min. The signal is detected with a thermal conductivity detector at 70 mA. The hydrogen capture is calculated from the surface area missing from the hydrogen signal of the baseline at room temperature to the baseline at 900° C. The temperature is measured using a thermocouple placed in the center of the sample and from the resulting curve the maximum reducibility temperature as defined hereinabove is deduced.

EXAMPLE 1

This example relates to a composition with 50% zirconium, 40% cerium, 5% lanthanum and 5% yttrium, these proportions being expressed in mass percentages of the oxides $ZrO_2$, $CeO_2$, $La_2O_3$ and $Y_2O_3$.

The necessary quantity of zirconium nitrate, cerium nitrate, lanthanum nitrate and yttrium nitrate are added to a stirred beaker. The volume is completed to 1 liter with distilled water to obtain a 120 g/l nitrate solution.

A solution of ammonia (12 mol/l) is added to another stirred beaker and the volume is completed to a total of 1 liter with distilled water to obtain a stoichiometric ammonia excess of 20% relative to the cations to be precipitated.

Both solutions prepared previously are held with constant stirring and are added continuously to a Hartridge-Roughton rapid mixer of the type in FIG. 1 with entry height (a) of 2 mm. The pH on leaving the mixer is 9.5. The flow rate for each of the reagents is 30 l/h and the residence time is 12 ms.

The suspension of precipitate thus obtained is placed in a stainless-steel autoclave equipped with a stirring rotor. The temperature of the medium is brought to 125° C. for 1 hour with stirring.

To the suspension thus obtained, 33 grams of lauric acid are added. The suspension is kept stirring for 1 hour.

The suspension is then filtered on a Buchner funnel, then the filtered precipitate is washed with aqueous ammonia. The resulting product is then brought to 700° C. and held for 4 hours.

COMPARISON EXAMPLE 2

This example relates to the same composition as example 1.

Starting from the same reagents, 1 liter of a solution of zirconium nitrate, cerium nitrate, lanthanum nitrate and yttrium nitrate is prepared.

To a stirred reactor, a solution of ammonia (12 mol/l) is added and the volume is completed to a total of 1 liter with distilled water to obtain a stoichiometric ammonia excess of 20% relative to the nitrates to be precipitated.

The solution of nitrates is added to the reactor with constant stirring over 1 hour. After the precipitation, the same procedure is followed as in example 1.

EXAMPLE 3

This example relates to the same composition as example 1, which is prepared under the same conditions with the only difference being the fact that the initial ammonia solution is prepared so as to have a stoichiometric ammonia excess of 5% relative to the cations to be precipitated.

EXAMPLE 4

This example relates to a composition with 72% zirconium, 21% cerium, 2% lanthanum and 5% neodymium, these proportions being expressed in mass percentages of the oxides $ZrO_2$, $CeO_2$, $La_2O_2$ and $Nd_2O_2$.

The necessary quantities of zirconium nitrate, cerium nitrate, lanthanum nitrate and neodymium nitrate are added to a stirred beaker. The volume is completed to 1 liter with distilled water to obtain a 120 g/l nitrate solution.

A solution of ammonia (12 mol/l) is added to another stirred beaker and the volume is completed to a total of 1 liter with distilled water to obtain a stoichiometric ammonia excess of 20% relative to the cations to be precipitated.

Both solutions prepared previously are kept constantly stirring and are added continuously to a Hartridge-Roughton rapid mixer of the type in FIG. 1 with entry height (a) of 2 mm. The pH on leaving the mixer is 9.6. The flow rate for each of the reagents is 50 l/h and the residence time is 7 ms.

The suspension of precipitate thus obtained is placed in a stainless-steel autoclave equipped with a stirring rotor. The temperature of the medium is brought to 150° C. for 1.5 hours with stirring.

To the suspension thus obtained, 40 grams of lauric acid are added. The suspension is held with stirring for 1 hour.

The suspension is then filtered on a Buchner funnel, then the filtered precipitate is washed with aqueous ammonia.

The resulting product is then brought to 700° C. and held for 4 hours.

COMPARISON EXAMPLE 5

This example relates to the same composition as example 4.

Starting from the same reagents, 1 liter of a solution of zirconium nitrate, cerium nitrate, lanthanum nitrate and neodymium nitrate is prepared.

A solution of ammonia (12 mol/l) is added to a stirred reactor and the volume is completed to a total of 1 liter with distilled water to obtain a stoichiometric ammonia excess of 20% relative to the nitrates to be precipitated.

The solution of nitrates is added to the reactor with constant stirring over 1 hour.

After the precipitation, the same procedure is followed as in example 4.

Table 1 below gives the characteristics of the products obtained in the examples.

TABLE 1

| Example | Specific surface area (m²/g) after calcination for 6 hours at | | Maximum reducibility temperature | |
|---|---|---|---|---|
| | 900° C. | 1000° C. | 1000° C.[1] | 1100° C.[1] |
| 1 | 78 | 57 | 469° C. | 453° C. |
| Comparison 2 | 69 | 50 | 580° C. | 555° C. |
| 3 | 82 | 60 | 450° C. | 455° C. |
| 4 | 78 | 55 | 480° C. | 417° C. |
| Comparison 5 | 65 | 50 | 564° C. | 560° C. |

[1]this is the temperature that the composition was previously subjected to before measuring reducibility.

It should be noted that the products in examples 1 and 5 are in the form of a solid solution after 6 hours' calcination at 900° C. or 1000° C.

Figure 2:
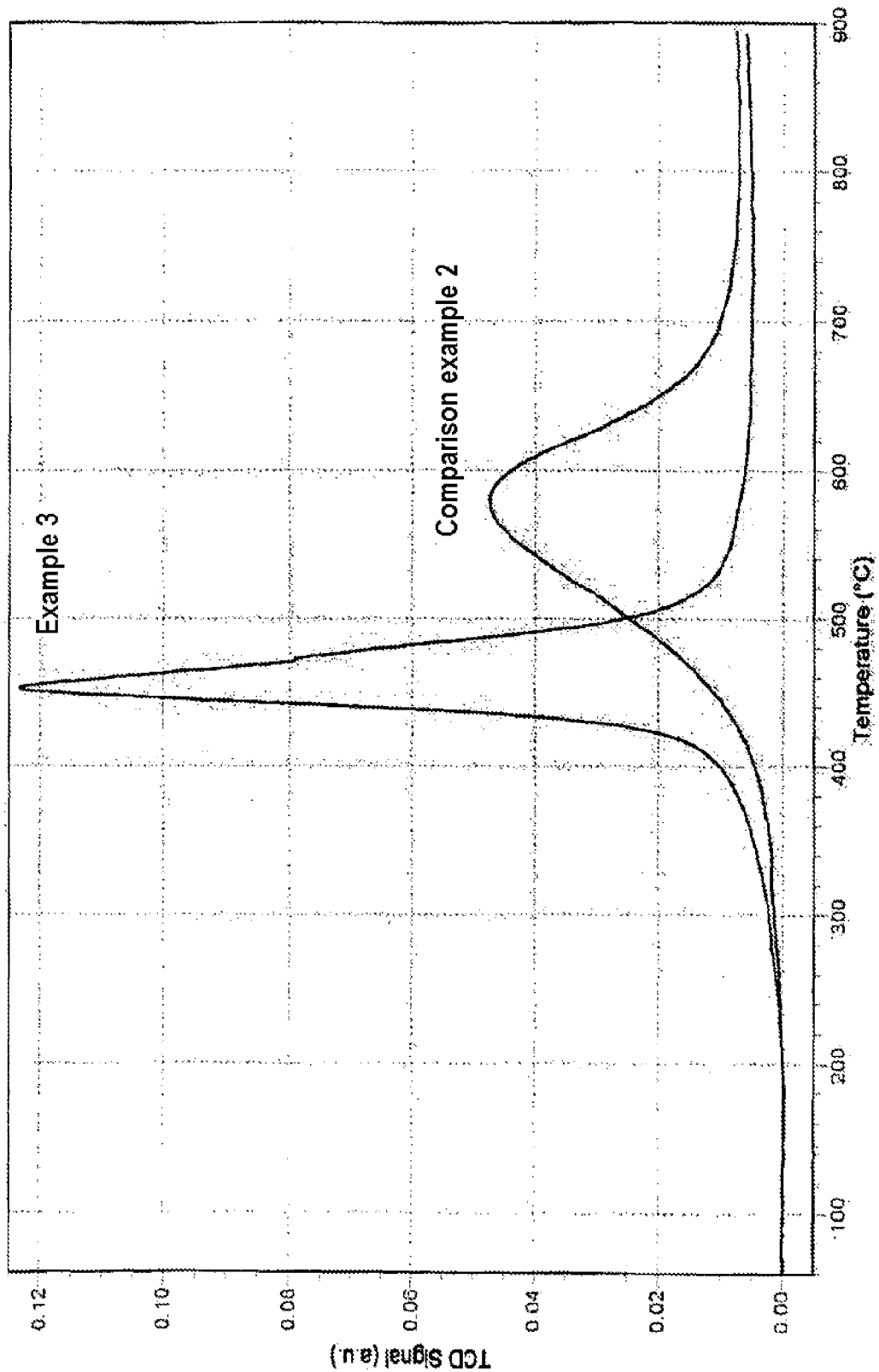
FIG. 2 shows the plots obtained by measuring reducibility by a reduction with programmed temperature for a composition as claimed in the invention and a comparison product.

FIG. 2 shows the curves obtained using the reducibility measurement described hereinabove. Temperature is on the x-axis and the value of the signal measured is on the y-axis. The maximum reducibility temperature is that corresponding to the maximum peak height on the curve. The figure gives the curves obtained for the compositions in comparison example 2 and example 3.

Table 2 below gives the particle size characteristics for the products in the examples.

Particle size is measured under the following conditions.

Apparatus: Beckman Coulter Laser LS13-320 Particle-Size Analyzer (particle size analysis by laser diffraction)

Fraunhofer Optical Model with PIDS (polarization intensity differential scattering)

Sample: a mass of 0.5 g of product is suspended in a sonication tank (AEROSEC Delta 011CT) and in a volume of 80 ml of a 1 g/l hexamethylphosphate (HMP) solution.

The suspension is deagglomerated by operating the tank for 5 min at 120 Watts.

Measurements: two measurements are taken from the suspension with and without the sonication treatment.

For these measurements a sample of suspension is taken from the sonication tank and is placed in the particle-size analyzer while maintaining magnetic stirring.

The measurement is taken under the following conditions: Obscuration<10% PIDS 50%.

TABLE 2

| | $D_{50}$ (μm) | |
| --- | --- | --- |
| Example | Initial product | Product after treatment |
| 1 | 14 | 6 |
| Comparison 2 | 13.3 | 11.6 |

The initial product is the product obtained at the end of the process described in the examples, i.e. after calcination at 700° C.

The product after treatment is the product resulting from sonication of the initial product.

The product in the comparison example is practically not able to be deagglomerated by contrast to that of example 1 as claimed in the invention.

The invention claimed is:

1. A calcined composition comprising oxides of zirconium, cerium and at least one rare earth other than cerium, having a cerium oxide content of at most 50% by mass, wherein after calcination at 1000° C. for 6 hours, the composition has a maximum reducibility temperature of at most 500° C. and a specific surface area of at least 45 m$^2$/g.

2. The composition as defined by claim 1, wherein after calcination at 1000° C. for 6 hours, the composition has a maximum reducibility temperature of at most 480° C.

3. The composition defined by claim 1, wherein that after calcination at 1000° C. for 6 hours, the composition has a maximum reducibility temperature of at most 450° C.

4. The composition as defined by claim 1, wherein after calcination at 1000° C. for 6 hours, the composition has a specific surface area of at least 50 m$^2$/g.

5. The composition as defined by claim 1, wherein the composition has a cerium oxide content of from 10% to 50%.

6. The composition as defined by claim 1, wherein the composition has a content of the other rare earth oxide of at most 30%.

7. The composition as defined by claim 1, wherein the rare earth is selected from a group consisting of yttrium, lanthanum, neodymium, praseodymium and gadolinium.

8. The composition as defined by claim 1, wherein after calcination at 900° C. for 6 hours, the composition has a specific surface area of at least 60 m$^2$/g.

9. The composition as defined by claim 1, wherein the composition is deagglomerated by sonication to form particles having a median diameter ($d_{50}$) variation of at least 30%.

10. The composition as defined by claim 1, wherein after calcination at 1100° C. for 4 hours, the composition has a maximum reducibility temperature of at most 500° C.

11. A method of preparing a composition as defined by claim 1, the process comprising the following steps:
    (a) forming a liquid mixture comprising compounds of zirconium, cerium and the other rare earth;
    (b) reacting said mixture in a continuous process in a reactor with a basic compound, wherein residence time in the reactor is at most 100 milliseconds, and from which a precipitate is obtained when it leaves the reactor;
    (c) heating said precipitate in an aqueous medium, and maintaining the medium at a pH of at least 5;
    (d) adding an additive to the precipitate obtained from step (c), wherein the additive is selected from the group consisting of an anionic surfactant, a nonionic surfactant, a polyethylene glycol, a carboxylic acid and a salt thereof, and a surfactant of a carboxymethyl fatty acid ethoxylate type; and
    (e) calcining the resulting precipitate obtained from step (d).

12. The method as defined by claim 11, wherein the zirconium, cerium and other rare earth compound are selected from the group consisting of a nitrate, a sulfate, an acetate, a chloride, and a ceric ammonium nitrate.

13. The method as defined by claim 11, wherein the precipitate is heated in step (c) at a temperature of at least 100° C.

14. The method as defined by claim 11, wherein the residence time in the reactor is at most 20 milliseconds.

15. A catalytic system, wherein the catalytic system comprises the composition as defined by claim 1.

16. A method for treating exhaust gases for internal combustion engines, wherein the method comprises treating the exhaust gases using the catalytic system as defined by claim 15.

17. The composition as defined by claim 4, wherein the specific surface area is at least 55 m$^2$/g.

18. The composition as defined by claim 6, wherein the content of the other rare earth oxide is at most 20%.

19. The composition as defined by claim 8, wherein the specific surface area is at least 70 m$^2$/g.

20. The composition as defined by claim 9, wherein the particles have a median diameter ($d_{50}$) variation of at least 50%.

* * * * *